United States Patent Office 3,483,870
Patented Dec. 16, 1969

3,483,870
SURGICAL USE OF ADHESIVE COMPOSITIONS
Harry W. Coover, Jr., Kingsport, Tenn., and David W. Fassett, Rochester, N.Y., assignors to Eastman Kodak Company, Rochester, N.Y., a corporation of New Jersey
No Drawing. Filed Apr. 22, 1963, Ser. No. 274,848
Int. Cl. A61b *17/04;* A61k *27/00;* A01n *17/00*
U.S. Cl. 128—334       8 Claims

ABSTRACT OF THE DISCLOSURE

This invention relates to a surgical method for joining tissue surfaces through the use of an α-cyanocrylate adhesive and more particularly to an improved method which comprises the use of a substance with the α-cyanocrylate which is particularly adapted for accelerating the bonding action under surgical conditions. The accelerating substances employed are basic organic nitrogen compounds which serve the dual function of a polymerization catalyst and a physiological active agent, such as a vasoconstrictor or local anesthetic.

---

The usual methods for closing incisions in flesh and for setting bone fractures, by the use of sutures, clamps, pins or the like, have many drawbacks. The use of an adhesive substance for these surgical purposes would have the advantage of permitting rapid joining of the damaged members and of permitting natural healing. However, the common adhesives are unsuitable for surgical use. Most adhesives need too much time to form a bond. Many require the use of heat or pressure or the evaporation of a solvent, all of which make them unsuitable as surgical adhesives. Other adhesives, including some that might otherwise be suitable for surgical use, are excessively irritating to the body tissues.

A recent surgical development is the use of methyl α-cyanoacrylate, $CH_2{:}C(CN)COOCH_3$, as a bone cement positions comprising the monomeric esters of α-cyanoacrylate polymerizes in situ without the use of heat or pressure or the evaporation of a solvent. Our co-pending application Ser. No. 225,896, filed Sept. 24, 1962, now abandoned discloses the use of surgical adhesive compositions comprising the monomeric esters of α-cyanoacrylic acid of the formula, $CH_2{:}C(CN)COOR$, wherein R is a saturated hydrocarbon radical of 2 to 10 carbon atoms, of which those of 3 to 6 carbon atoms, and most especially isobutyl, produce the most outstanding advantages. Such higher esters of α-cyanoacrylic acid have been found to be superior to methyl-2-cyanoacrylate as surgical adhesives in a number of respects. Our co-pending patent application Ser. No. 225,896, filed Sept. 24, 1962 discloses that the higher esters of α-cyanoacrylic acid have such advantages in the surgical use as superior flexibility, absence of irritating vapor, superior hydrolytic stability and more consistent formation of rapid bonds under surgical conditions.

The higher esters of α-cyanoacrylic acid are thus preferred but the methyl ester is more readily available and has advantages over conventional adhesive compositions for surgical purposes. Furthermore, although less desirable for surgical use, the α-cyanoacrylate esters wherein R is cyclohexyl or phenyl have utility as adhesives and can be employed with polymerization accelerators as described herein in accordance with the invention. Accordingly, the surgical method of the present invention can be employed with the esters of α-cyanoacrylic acid of the formula, $CH_2{:}C(CN)COOR$, wherein R is alkyl, cyclohexyl or phenyl, although the greatest advantages are obtained when R is an alkyl radical of 2 to 10 carbon atoms, preferably.

The method of the present invention is based on our discovery that certain basic organic nitrogen compounds accelerate the bonding of the α-cyanoacrylate adhesive in surgical use and also provide desirable physiological results, thus, serving a plural function as a polymerization catalyst and as a physiologically active agent.

The basic organic nitrogen compounds that produce the best results in our new method are β-substituted ethylamines of the formula:

(I)  

wherein $R^1$ can be alkyl or cycloalkyl of 4 to 6 carbon atoms but, preferably, is phenyl or phenyl substituted with hydroxy or lower alkoxy, or the like. $R^2$ is hydrogen, lower alkyl, preferably methyl, or hydroxyl; $R^3$ and $R^4$ are hydrogen or lower alkyl; and at least one of $R^2$, $R^3$ and $R^4$ is hydroxyl or lower alkyl.

The organic nitrogen compounds (I) are basic compounds which catalyze the polymerization of the α-cyanoacrylate monomers and thus accelerate the formation of a bond. This is particularly advantageous in forming surgical bonds because the bond must form quickly so that the use of clamps or sutures can be avoided or reduced to a minimum. While the ability of this class of compounds to accelerate the surgical bonding of the α-cyanoacrylate monomers without adverse physiological effects, by itself constitutes an extremely valuable characteristic, these compounds have another property which uniquely adapts them for coaction with α-cyanoacrylate adhesives in surgical uses. The organic nitrogen compounds of this class function as vasoconstrictors. Consequently, they serve to stop or inhibit the flow of blood or other fluids into the area in which the adhesive is being used. The presence of body fluids on the surfaces to be joined has been a factor that has caused the α-cyanoacrylate monomers to be less successful as surgical adhesives in some instances than would be desired. Consequently, the discovery of materials which both speed the formation of a bond and reduce the flow of fluids into the area to be adhered provides a valuable improvement in the use of α-cyanoacrylate adhesives for surgical purposes.

The compounds of type (I) which have a plural function in catalyzing polymerization and in providing a useful physiological effect during the surgical bonding are described in chapter 27 in "Pharmacology in Medicine," 2nd edition by V. A. Drill, McGraw-Hill Book Company, New York, 1958. They are referred to as adrenergic agents. Of this group of substances the ones most successful in catalyzing the reaction and in functioning as vasoconstrictors are the pressor amines of the β-phenyl ethylamine type. The prototype of the latter class of compounds and the compound that offers the greatest advantages in the method of the invention is epinephrine, also known as adrenaline, which has the formula,

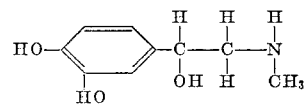

and is thus a compound of type (I) wherein $R^1$ is 3,4-dihydroxyphenyl, $R^2$ is hydroxyl, $R^3$ is hydrogen and $R^4$ is methyl.

Examples of other compounds of type (I) and their structure according to the general Formula I, are given in the following table.

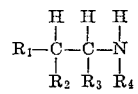

| Name | R₁ | R₂ | R₃ | R₄ |
|---|---|---|---|---|
| Epinephrine | 3,4-dihydroxyphenyl | OH | H | CH₃ |
| 1-arterenol | do | OH | H | H |
| Isopropylarterenol | do | OH | H | i-C₃H₇ |
| Ethylnorepinephrine | do | OH | C₂H₅ | H |
| Nordefrin | do | OH | CH₃ | H |
| Phenylephrine | 3-hydroxyphenyl | OH | H | CH₃ |
| Metaraminol | do | OH | CH₃ | H |
| 1-(4-hydroxyphenyl)-2-methylaminoethanol | 4-hydroxyphenyl | OH | H | CH₃ |
| Hydroxyamphetamine | do | H | CH₃ | H |
| Methoxamine | 2,5-dimethoxyphenyl | OH | CH₃ | H |
| Methoxyphenamine | 2-methoxyphenyl | H | CH₃ | CH₃ |
| Dl-Norephedrine | Phenyl | OH | CH₃ | H |
| Ephedrine | do | OH | CH₃ | CH₃ |
| Amphetamine | do | H | CH₃ | H |
| Methamphetamine | do | H | CH₃ | CH₃ |
| Mephentermine | do | H | di-CH₃ | CH₃ |
| Phenylpropylmethylamine | do | CH₃ | H | CH₃ |
| Propylhexedrine | Cyclohexyl | H | CH₃ | CH₃ |
| Cyclopentamine | Cyclopentyl | H | CH₃ | CH₃ |
| 2-methylaminoheptane | n-Butyl | H | CH₃ | CH₃ |
| 2-aminoheptane | do | H | CH₃ | H |
| 2-amino-4-methylhexane | Isobutyl | H | CH₃ | H |

The other general class of basic organic nitrogen compounds that can be employed in the method of the invention are the local anesthetics of the class represented by cocaine. Such compounds include: (a) esters of benzoic acid and of p-aminobenzoic acid with aliphatic or cyclic amino alcohols, and (b) anilino derivatives such as: anilides of aniline or of substituted aniline compounds with aliphatic amino carboxylic acids, and urethane and azomethine compounds containing one or two anilino or substituted anilino redicals. Compounds of this type are disclosed in chapter 9 of "Pharmacology in Medicine," supra, and include the following typical substances:

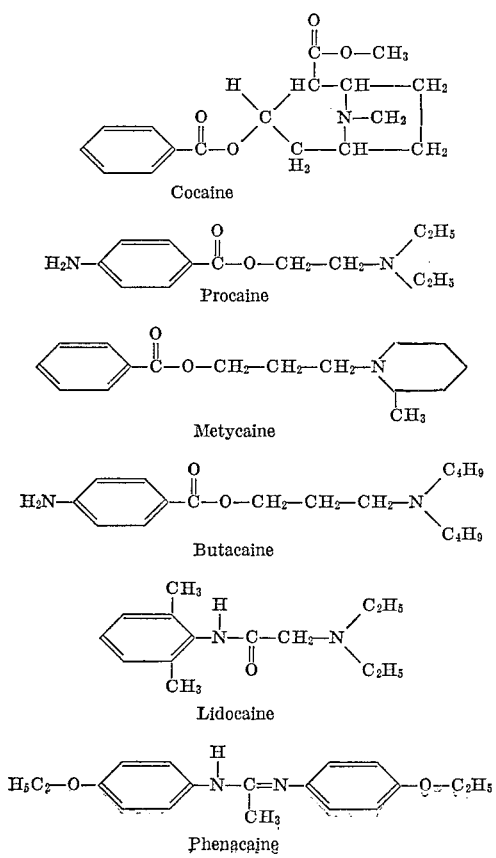

Cocaine

Procaine

Metycaine

Butacaine

Lidocaine

Phenacaine

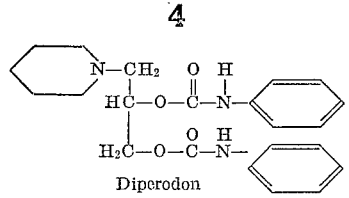

Diperodon

In general it can be said that the basic promoters used in our method should have a base ionization constant of $1 \times 10^{-5}$ to $1 \times 10^{-14}$ and should be reatively innocuous in their effect on the body tissues. Both types of basic organic nitrogen compounds used in our method, i.e., the vasoconstrictors and the local anesthetics, are often provided in the form of acid addition salts for solubility purposes. They can be used in the form of such salts in our method. Examples of suitable acid addition salts include those derived from mineral acids such as hydrochloric, hydroiodic, nitric, phosphoric and sulfuric acids; and organic acids such as acetic, citric, tartaric and lactic acids; and in general any such substance that will form a surgically acceptable quaternary ammonium salt that is not excessively toxic or irritating to the body tissues. When we refer to the use of the vasoconstrictor and local anesthetic basic nitrogen compounds in our specification and claims we mean to include such quaternary salts having substantially equivalent properties and function in the method of the invention.

The polymerization promoting effect depends on the basicity of the nitrogen compound. However, this does not preclude the use of an acid addition salt because the promoter is present in such low concentrations that it is neutralized by the alkaline body fluids and the basic organic nitrogen compound is thus released to exert its effect as a basic polymerization promoter.

The vasoconstrictor or the local anesthetic is normally used in dilute solution with a suitable solvent, e.g., water, ethanol, chloroform, diethylether, acetone or the like. The particular concentration is normally not critical but solutions, e.g., of 0.001 to 5 weight percent, are generally suitable. The amount of the organic nitrogen compound to be used will be of the order of the suitable dosages for the physiological effect, i.e., for vasoconstriction or local anesthesia, as recommended by standard treatises, e.g., The Merck Index, seventh edition, Merck & Co., Inc. Rahway, N.J., publishers (1960). Such dosages will vary according to the particular substance being used but the typical dosages, e.g., 0.2 to 200 mg. are normally adequate to promote rapid polymerization of the α-cyanoacrylate as well as to accomplish the physiological purpose.

The described esters of α-cyanoacrylic acid have reasonably good stability as monomers when stored in bulk, especially when the esters are of high purity. However, polymerization inhibitors can be used to increase the storage stability and such adhesive compositions containing inhibitors can be employed in the method of the invention. Suitable inhibitors or stabilizers that can be used in small amounts, e.g., 0.0001 to 0.01 weight percent, include sulfur dioxide, hydroquinone nitric oxide, organic acids, etc. The preferred stabilizers are those having the least adverse physiological effect. One advantage of the method of the invention is that it makes possible the obtaining of rapid surgical bonds with α-cyanoacrylate adhesives that have been excessively stabilized.

The esters of α-cyanoacrylic acid can be used alone or blended with minor amounts of additives such as thickening agents, plasticizers, antibiotics or the like. Mixtures of the α-cyanoacrylic acid esters can also be used. Of course, the materials mixed with the α-cyanoacrylate ester must not cause the monomeric ester to polymerize prematurely and must not have an adverse effect on the healing process.

Examples of suitable thickening agents or viscosity modifiers for such compositions include various polymeric or resinous materials such as poly(alkyl 2-cyanoacrylates), poly-(acrylates), poly(methacrylates), cellulose esters such as cellulose acetate, cellulose butyrate, cellulose acetate phthalate and the like, etc., the polymers of alkyl 2-cyanoacrylates being preferred. Typical of the suitable plasticizers are dimethyl sebacate, di-n-butyl sebacate, di-n-octyl phthalate, triethyl phosphate, triisobutyl phosphate, tri(2-ethylhexyl) phosphate, tri-p-cresyl phosphate, glyceryl triacetate, glyceryl tributrate, diethyl sebacate and other plasticizer esters of the types disclosed in the patent to Joyner and Coover, U.S. 2,784,127.

In the compositions containing additives, the α-cyanoacrylate monomer is the major component and preferably is at least about 75 weight percent of the composition. These compositions can contain up to about 20 percent by weight, based on the α-cyanoacrylate monomer, of the described polymeric thickening agent or viscosity modifier and up to about 20 percent by weight based on the monomer of the described plasticizers. Preferably, for rapid adhesive action the amount of plasticizer is about 1 to 5 percent by weight based on the monomer. In this preferred range the ester plasticizers improve the flexibility of the adhesive bond without adversely affecting the adhesive qualities of the α-cyanoacrylate.

The exact manipulative procedures by which the method of the invention is carried out can be varied considerably. One suitable procedure is to apply the vasoconstrictor or local anesthetic polymerization promoter by brush, spray or otherwise to the surface of the flesh incision or bone fracture. This provides an initial effect of blanching and drying the area to be adhered or of anesthetizing the area. The α-cyanoacrylate adhesive is applied to one or both of the surfaces. The surfaces are then promptly brought together, aligned properly and held together briefly, with no more than light pressure, until a bond is formed.

In another suitable procedure the α-cyanoacrylate adhesive is applied to the tissue surfaces to be joined, they are then brought together and aligned and the area is sprayed with the vasoconstrictor or local anesthetic promoter. Other manipulative techniques are also possible, the essential procedure being the application of the α-cyanoacrylate monomer to at least one of the surfaces to be joined and the contacting of the α-cyanoacrylate monomer and the tissue surface with the basic organic nitrogen compounds.

A technique that can be used in connection with the method of the invention is the use of surgical grades of absorbable cellulose, such as oxidized cellulose, to absorb body fluids and aid in obtaining a dry field for the adhesive. The α-cyanoacrylate adhesives and the promoters used in the method of the invention are compatible with the oxidized cellulose which is absorbed by the body.

Certain organic nitrogen compounds are sufficiently volatile that their vapor will be capable of catalyzing polymerization in spaces hard to reach directly by liquid contact. Some examples of potentially useful volatile basic organic compounds (I) which also possess vasoconstricting properties are 2-methylamino heptane, cyclopentamine, 2-aminoheptane and 2-amino-4-methylhexane. These materials then provide a combined usefulness due to their vasoconstricting, catalyzing and volatile properties.

These basic vasoconstrictor or local analgesic type catalysts also possess another advantage in that they are capable of causing more complete polymerization throughout a mass of α-cyanoacrylate monomer such as that which might be encountered in filling a gap in a bony structure. It has been found that under such circumstances, complete polymerization may not occur throughout such a mass and that the retention of some monomeric material may be irritating or otherwise deleterious. This disadvantage can be overcome by the use of catalysts of types (I) and (II) and also by other types of basic catalysts which do not possess vasoconstricting or analgesic properties.

A further advantage of the described organic nitrogen compounds (I) is that they may be used to impregnate absorbable surgical packing materials such as gelatine foam or oxidized cellulose sponges which may be used in conjunction with alkyl-α-cyanoacrylates.

The following examples illustrate surgical procedures in accordance with the invention.

EXAMPLE 1

Several tests were performed on guinea pigs. The general procedure was that the guinea pigs were immobilized, a local anesthetic was injected into a large area of the back, and lateral incisions of about 2 to 4 centimeters were made across the mid-back region. Full thickness incisions were made and the wounds were gaped with a moderate amount of bleeding. The blood was sponged and hemostats were used to reduce further bleeding. Following this preliminary hemostasis the edges of the incision were flushed with a standard 1:1000 solution of epinephrine. In each instance this produced an immediate blanching and drying of the area. Isobutyl α-cyanoacrylate monomer was drawn into a capillary tube and excessive quantities were applied to both surfaces of the skin from the capillary tube. Excess adhesive was quickly wiped off and the two edges were lightly pinched together until they adhered. It was found in each instance that an immediate and strong bond formed between the tissue surfaces. In no case was any significant failure noted; in each test excellent adhesion was achieved.

EXAMPLE 2

The same general procedure as in Example 1 was employed for closing another series of incisions in guinea pigs, except that methyl 2-cyanoacrylate was employed as the adhesive monomer instead of isobutyl 2-cyanoacrylate. No significant failure was noted. In all tests excellent adhesion was achieved.

EXAMPLE 3

The adhesive composition employed in this test was monomeric isobutyl 2-cyanoacrylate which contained an excessive amount of polymerization inhibitor. As a result it did not give rapid in vivo surgical bonds. The surgeon applied the adhesive to the incision in the guinea pig, placed the mating surfaces in perfect juxtaposition and then sprayed the area with a 1 percent solution of procaine in ethanol. The bond formed rapidly. On healing the cut produced a very fine scar line.

EXAMPLE 4

In closing a three-inch incision in a guinea pig the surgeon spread a thin film of isobutyl 2-cyanoacrylate adhesive on one of the skin surfaces. On the other surface he brushed a solution of procaine in ethanol. He pressed the surfaces together and the bond formed rapidly.

We have described the results of tests on test animals, but it should be understood that the method of the invention is not limited to veterinary use. It can also be used on humans.

Although the invention has been described in considerable detail with reference to certain preferred embodiments thereof, variations and modifications can be effected within the spirit and scope of this invention as described hereinabove and as defined in the appended claims.

We claim:

1. The method for surgical bonding of body tissues which comprises applying to at least one of the tissue surfaces to be bonded an adhesive composition comprising a monomeric ester of α-cyanoacrylic acid of the formula

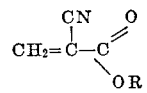

wherein R is a member of the group consisting of alkyl of 1 to 10 carbon atoms, cyclohexyl and phenyl; also applying to at least one of said tissue surfaces a basic organic nitrogen compound from the class consisting of vasoconstrictors and local anesthetics, bringing together the surfaces to be bonded such that said basic organic nitrogen compound is in contact with the α-cyanoacrylate monomer and with the tissue surface, and polymerizing the monomeric ester.

2. The method according to claim 1 in which said ester is isobutyl α-cyanoacrylate.

3. The method according to claim 1 in which said basic organic nitrogen compound is a pressor amine of the β-phenyl ethylamine type.

4. The method according to claim 1 in which said basic organic nitrogen compound is epinephrine.

5. The method according to claim 1 in which said basic organic nitrogen compound is procaine.

6. The method for surgical bonding of body tissues which comprises applying to at least one of the tissue surfaces to be bonded an adhesive composition comprising a monomeric ester of α-cyanoacrylic acid of the formula:

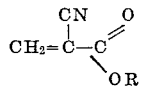

wherein R is alkyl of 1 to 10 carbon atoms, also applying to at least one of said tissue surfaces a solution of epinephrine, bringing together the surfaces to be bonded and polymerizing said monomeric ester while in contact with such surfaces.

7. The method according to claim 6 wherein said monomeric ester is isobutyl 2-cyanoacrylate.

8. The method according to claim 6 wherein said monomeric ester is methyl 2-cyanoacrylate.

References Cited

UNITED STATES PATENTS 2,481,419   9/1949   Hamilton ---------- 167—84 X
2,784,127   3/1957   Joyner et al.

OTHER REFERENCES

Carton et al.: "A Plastic Adhesive Method of Small Boold Vessel Surgery," from World Neurology, vol. 1, 1960, pp. 356–61.

DALTON L. TRULUCK, Primary Examiner

U.S. Cl. X.R.

424—81, 330